United States Patent [19]
Violleau

[11] 3,883,093
[45] May 13, 1975

[54] AIRCRAFT CONTROL ELEMENTS

[75] Inventor: André Violleau, Vitrolles-le-Roucas, France

[73] Assignee: Societe Nationale Industrielle Aerospatiale, Paris, France

[22] Filed: Feb. 2, 1972

[21] Appl. No.: 222,837

[30] Foreign Application Priority Data
Feb. 11, 1971 France .................. 71.04579

[52] U.S. Cl. .............. 244/42 D; 161/174; 244/82; 244/123; 267/57
[51] Int. Cl. .................................... B64c 9/02
[58] Field of Search..... 244/42 D, 42 DA, 124, 133, 244/123, 75 R, 82, 87; 416/230; 161/168, 174; 114/126, 162; 267/57

[56] References Cited
UNITED STATES PATENTS

| 1,400,078 | 12/1921 | Kempton | 244/133 |
|---|---|---|---|
| 2,370,844 | 3/1945 | Davis | 244/82 |
| 2,573,361 | 10/1951 | Rodgers et al. | 267/57 X |
| 2,696,956 | 12/1954 | Farr et al. | 244/82 X |
| 2,852,209 | 9/1958 | Petre | 244/42 D |
| 2,999,658 | 9/1961 | Pavlecka | 244/124 |
| 3,022,536 | 2/1962 | Floehr | 267/57 X |
| 3,094,195 | 6/1963 | Lund | 188/82.8 X |
| 3,574,104 | 4/1971 | Medler | 161/168 |

FOREIGN PATENTS OR APPLICATIONS

| 1,063,619 | 3/1967 | United Kingdom | 244/124 |
|---|---|---|---|
| 1,097,481 | 3/1968 | United Kingdom | 244/124 |

Primary Examiner—Trygve M. Blix
Assistant Examiner—Barry L. Kelmachter
Attorney, Agent, or Firm—Karl W. Flocks

[57] ABSTRACT

An aircraft control element which is a rigid flap secured to a longitudinal portion of a wing by at least one axially disposed elongated torsion element. The torsion element has rigid end parts and a twistable center with one end part rigidly secured to the flap and the other end part secured to aircraft structure.

14 Claims, 8 Drawing Figures

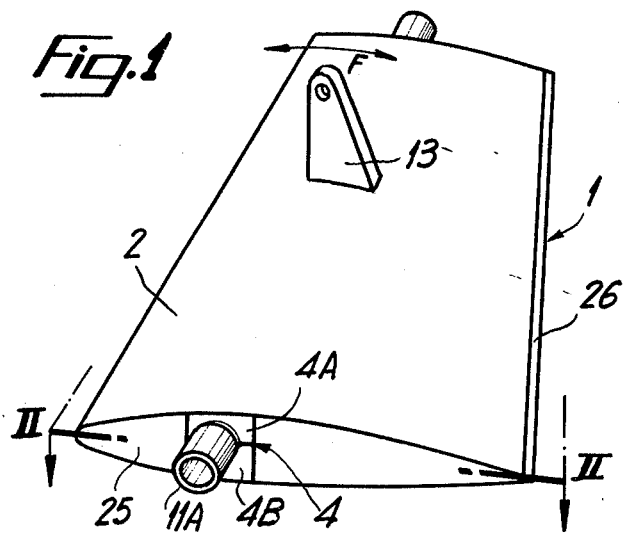
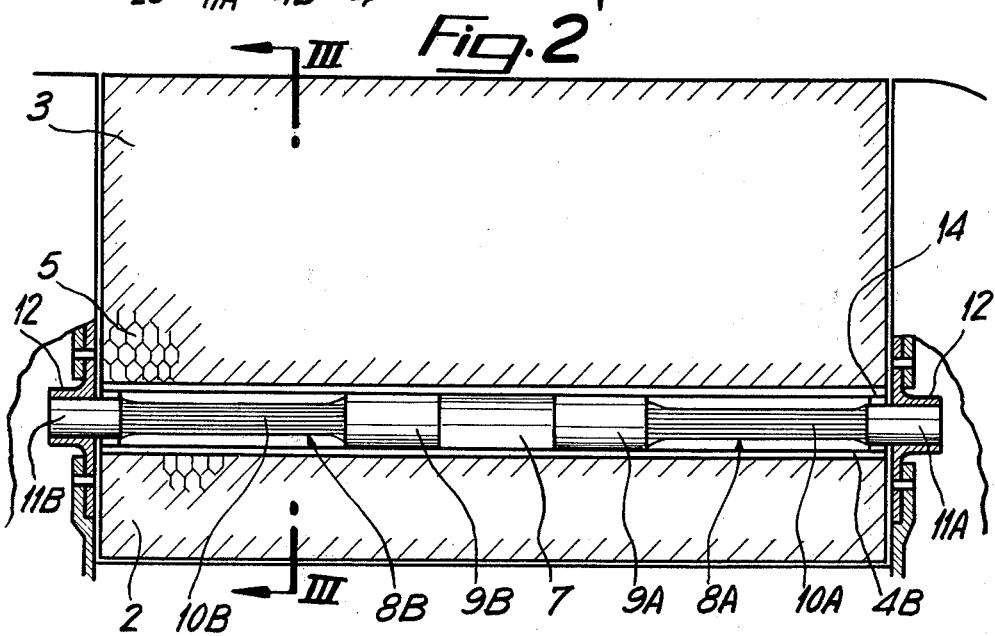
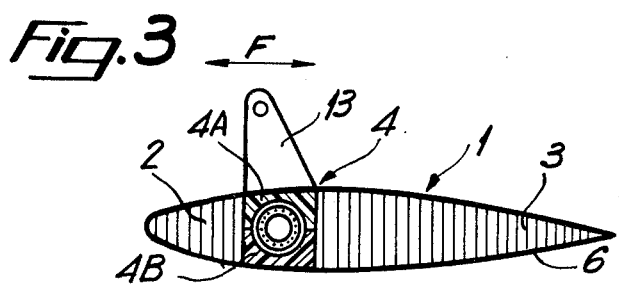

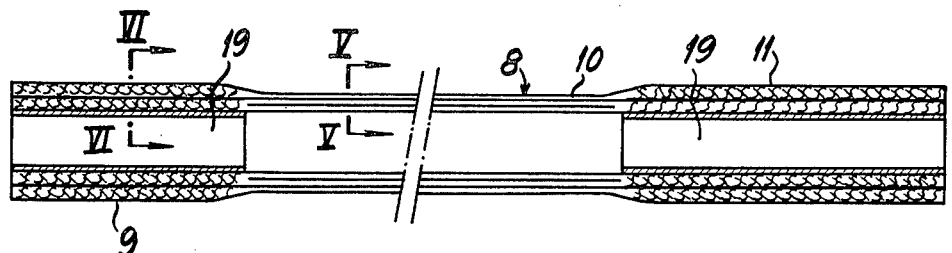
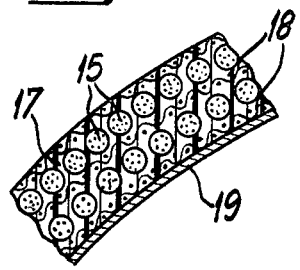
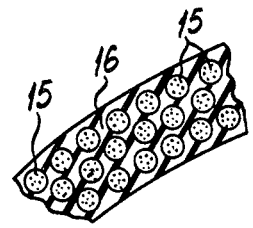
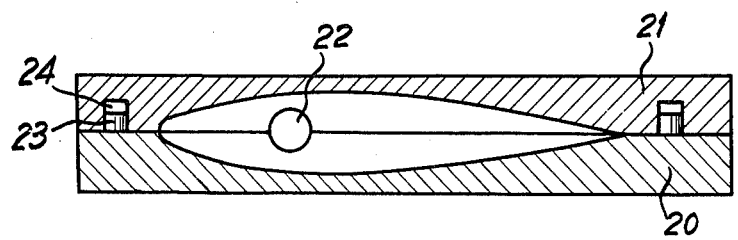
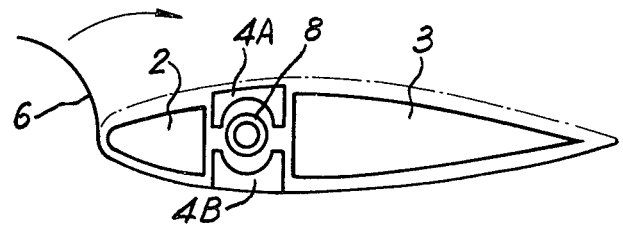

3,883,093

AIRCRAFT CONTROL ELEMENTS

This invention relates to a control element of use in piloting aircraft and comprising at least one portion orientable around a geometric axis.

Aircraft control elements usually comprise rigid flaps which are in shape streamlined and which have pivots pivoting in bearings borne by the aircraft structure. The pivots are usually made of metal, and to give the flap mechanical strength the pivots are usually rigidly secured to flap-reinforcing stringers extending over the span of the flap.

The pivots, bearings and stringers must therefore all be made of metal, a consideration which increases the weight of the control element. Also, the various items must be accurately machined if they are to operate satisfactorily, so that they are expensive. Another disadvantage is that control elements of this kind need periodic servicing and lubrication and are particularly likely to be damaged by sandstorms, which occur frequently in some climates.

This invention obviates these disadvantages. The invention obviates metal pivots, reduces control element weight and simplifies manufacture. It obviates servicing and lubrication and completely precludes corrosion. Another advantage provided by the invention is that a control element according to the invention returns automatically to its central position in the event of its actuation failing.

The aircraft control element according to the invention comprises a flap which is rigidly secured, parallel to its span, to at least one torsion element extending along the flap pivot axis and projecting beyond the flap on at least one side, the projecting end being secured to the aircraft structure. Advantageously, the torsion element is embodied as a tube and received in the thickness of the flap. Preferably, the torsion element is embodied by parallel elastomer-impregnated mineral fibres; alternatively, it can be embodied by very narrow high-strength steel wires.

To facilitate the connection of the tube to the flap and to the aircraft structure, the tube comprises over its length portions in which the mineral fibres are impregnated with a rigid resin, e.g. an epoxy resin.

Advantageously, two symmetrically arranged tubular portions are used for each flap, each such portion being rigidly secured at one end to the flap, the other end of each portion projecting beyond the flap and being secured to the aircraft structure by way of a support forming bearings and enabling the flap to be assembled and disassembled.

Advantageously, the torsion element (or the two portions thereof) is enclosed in a tubular stringer formed by two juxtaposed halves each in shape resembling a cylindrical half-shell. The torsion element is therefore closely confined in a tubular channel; this consideration does not hamper its torsional deformation but limits all other deformations which it might tend to take up under external stressing. To further improve this effect, the rigid portions of the element which project beyond the ends of the tubular stringer to secure the flap to the structure are engaged over an appreciable length in the stringer.

In this case, at each entry of the channel a sealing element can close the annular gap between the channel wall and the surface of the rigid portion extending beyond the torsion element.

The movements which the flap can make relatively to the structure are therefore strictly limited to pivoting around the axis of the tubular channel; if the flexible part of the torsion element ruptures, the flap, being retained at its ends by the rigid portions, cannot separate from the structure.

The accompanying drawings show how the invention can be carried into practice: In the drawings:

FIG. 1 is a perspective view of a control-element flap according to the invention;

FIG. 2 is a section on the line II—II of FIG. 1;

FIG. 3 is a section on the line III—III of FIG. 2;

FIG. 4 is an axial section through a tubular torsion element;

FIGS. 5 and 6 are partial cross-sections through the tubular element on section lines V—V and VI—VI respectively;

FIG. 7 is a view in cross-section of a mould for making a flap, and

FIG. 8 is a diagrammatic end view of the constituent elements of a flap separate from one another before being placed in the mould.

Referring to the drawings, a flap 1 comprises a front part 2 and a rear part 3 interconnected by a stringer 4. The parts 2, 3 are cut from blocks of a cellular "honeycomb" material, as can be seen in portions 5 in FIG. 2. Stringer 4 comprises two parts 4A, 4B, each formed with a semicylindrical channel-like recess. The honeycomb blocks and the stringer components 4A, 4B can be made of light alloy or of reinforced plastics.

As will be described in greater detail hereinafter, the constituent elements of the flap are assembled together by sticking and the complete assembly is stengthened by a cladding or covering 6 which is also stuck on and which can be a sheet or foil or the like of metal or a synthetic-resin-impregnated fabric.

The cylindrical channel 7 in stringer 4 contains two tubular parts 8A, 8B having twistable central parts 10A, 10B and rigid end parts 9A, 9B and 11A, 11B. Ends 9A, 9B are stuck to the inside wall of channel 7, but ends 11A, 11B project beyond flap 1 and are stuck into cylindrical recesses in bearing support members 12 enabling the flap to be secured to an aircraft aerofoil structure. The flap 2 also comprises an operating lever 13 which is with advantage, secured to stringer 4, preferably at the centre thereof.

When lever 13 is operated in one of the directions indicated by double arrows F, the flap pivots around the axis of the tubular elements 8A, 8B, the pivoting being possible because of the twisting of the elongated central portions 10A, 10B, the respective ends remaining rigidly secured to the flap and to the aircraft structure. The twisting is resilient and provides the flap with a torque tending to restore it to its central position. The flap 1 cannot move relatively to the structure except by pivoting around the axis of the channel 7, since the rigid ends 11A, 11B secured to the members 12 are engaged in the ends of the channel 7. Also, the diameter of the portions 11A, 11B is very near the diameter of channel 7.

If required, to prevent the entry of sand or rain or other foreign bodies into the cylindrical channel 7, the annular gap between the wall of channel 7 and the portions 11A, 11B has a gasket 14, for instance, in the form of a very deformable plastics permitting relative rotational movements and bending deformations of the elements 8A and 8B.

Details of the elements 8 are shown in FIGS. 4 and 5.

The main reinforcing framework of the elements 8 takes the form of fibres 15 which extend from end to end of the element 8 or of very narrow high-strength steel wires. Each fibre comprises a number of high-strength mineral filaments such as a "silicone" glass, boron or carbon, etc., agglomerated by an e.g. epoxy resin. The resin can make up from 20 to 50% of the total volume of the fibres. In the central portion 10 of each element 8 (FIG. 5), the fibres or wires 15 are encased in elastomer 16 which can also make up from 20 to 50% of the total volume. The elastomer, which can be e.g. on a polyurethane or silicone base, is chosen to have a fairly low shear module G, e.g. of from 0.1 to 10 hb, so that the fibres or wires of the central portion 10 can move relatively in the twisting deformation, during which such fibres or wires are stretched.

Referring to FIG. 6, in the rigid ends 9 and 11 the fibres or wires 15 are agglomerated with a rigid polymerisable resin 17 which can, for instance, be of the same kind as the resin which agglomerates the filaments of a single fibre. The ends 9, 11 are also reinforced by fabric layers 18 interleaved between the fibre or wire layers and, if required, by metal rings or pieces of tubing such as the tube 19 reinforcing the inside wall of the tubular element 8 in the portions 9, 11. By slightly increasing the diameter of the tubular element 8 at its ends, the various reinforcements facilitate the sticking of the parts 9 inside the channel 7 and the fitting of the portions 11 in the channel ends but prevent the central twistable portion from contacting the channel wall. In practice, a tubular element 8 can be made from resins and an elastomer which, even though physically and chemically incompatible, have substantially the same polymerisation and cross-linking temperatures respectively and which can stick to one another. As already stated, some epoxy resins and some silicone or polyurethane-based elastomers come under these heads.

The fibres are first prepared from filaments and their enveloping or potting resin is prepolymerised, whereafter the provisionally assembled fibres or the metal wires are placed on a cylindrical former and have their central portion impregnated with elastomer and their end portions impregnated with polymerisable resin, with or without interleaved fabrics between the fibre layers and/or metal rings. The assembly is then placed in a mould. Impregnation can be completed e.g. by vacuum action or by mechanical pressure, whereafter the mould is heated to simultaneously polymerise the resin and cross-link the elastomer.

After the constituent elements of a flap have been prepared, the cladding sheet 6 of the flap is first placed in bottom part 20 of a two-piece mould 20, 21 (FIG. 7), whereafter the front part 2, bottom stringer portion 4B and rear part 3 of the flap are placed on the cladding 6. The two tubular elements 8A, 8B are then positioned and their rigid parts 9A, 9B have adhesive applied to them, whereafter the top partial stringer 4A is positioned and its edges are secured to the edges of member 4B while the surfaces of member 4A are secured to the members 2, 3, whereafter the cladding sheet 6 is placed over the whole. The mould is then closed by placing part 21 on part 20; ends 11A, 11B are received in mould cavities 22, accuracy of the assembly being ensured by the teats 23 and the associated cavities 24 of the mould parts. After the adhesive sticking the various parts together has been heated in the oven, protective sheets or foils or the like 25 can be stuck to the flap sides and a strip 26 for connection of the ends of the cladding 6 can be placed astride the trailing edge.

The invention is of use for the various control elements used in aircraft, more particularly lightweight craft.

I claim:

1. In an aircraft control element attached to an aircraft structure comprising at least one flap pivoting around an axis parallel to its span, the improvement that the flap is rigidly secured to a longitudinal portion of at least two symmetrically, axially disposed elongated torsion elements, another longitudinal portion of each such element being separate from the first portion and rigidly secured to the aircraft structure.

2. The improved element of claim 1, wherein the elongated elements are each cylindrical and received in a correspondingly shaped channel in the flap.

3. The improved element of claim 2, wherein the elongated elements are each tubular and each has rigid portions enabling it to be secured to the flap and to the structure respectively, the rigid portions of each element being separated by at least one twistable portion.

4. The improved element of claim 3 wherein the flap is rigidly secured to the inner ends of two elongated tubular elements whose rigid outer ends project beyond the flap and engage in the channel with the aircraft structure.

5. The improved element of claim 4, wherein the tubular elongated elements are identical and a lever for operating the control element is secured thereto at the centre of the span of the control element.

6. The improved element of claim 4, wherein the channel diameter is similar to the diameter of the tubular elements and the channel has at its ends a sealing element between each of the rigid ends of the tubular element and the channel inside wall.

7. The improved element of claim 2 wherein the channel is provided inside a flap-reinforcing stringer.

8. The improved element of claim 7, wherein the stringer consists of two halves which are assembled together and each of which is formed with a hemicylindrical recess.

9. The improved element of claim 7, wherein the flap consists of elements cut from blocks of cellular substance which are assembled to the stringer, an assembly of stringer halves, and said cellular substance elements being made rigid by a stuck-on cladding.

10. The improved element of claim 1, wherein the elongated torsion elements comprise mineral fibres formed by mineral filaments agglomerated by a polymerisable resin, the fibres being agglomerated by a cross-linked elastomer.

11. The improved element of claim 1, wherein the elongated torsion elements comprise high-strength metal wires agglomerated by a cross-linked elastomer.

12. The improved element of claim 10, wherein the fibres extend over the whole length of each of the elongated torsion elements, and rigid portions attaching said flap to the aircraft structure are formed by local agglomeration of the fibres by a polymerisable resin.

13. The improved element of claim 12, wherein said rigid portions include annular elements.

14. The improved element of claim 11, wherein the wires extend over the whole length of each of the elongated torsion elements and rigid portions attaching said flap to the aircraft structure are produced by local agglomeration of the metal wires by a polymerisable resin.

* * * * *